Jan. 7, 1941.   R. A. BAUDRY   2,228,104
AIR COOLED BEARING FOR DYNAMOELECTRIC MACHINES
Filed March 25, 1938   4 Sheets-Sheet 1

WITNESSES:
Leon M. Garman
F. P. Lyle

INVENTOR
René A. Baudry.
BY O. B. Buchanan
ATTORNEY

Jan. 7, 1941.      R. A. BAUDRY      2,228,104
AIR COOLED BEARING FOR DYNAMOELECTRIC MACHINES
Filed March 25, 1938     4 Sheets-Sheet 4

WITNESSES:
Leo M. Garman
F. P. Lyle

INVENTOR
Rene' A. Baudry.
BY O. B. Buchanan
ATTORNEY

Patented Jan. 7, 1941

2,228,104

UNITED STATES PATENT OFFICE 2,228,104

AIR COOLED BEARING FOR DYNAMO-ELECTRIC MACHINES

René A. Baudry, Pittsburgh, Pa., assignor to Westinghouse Electric & Manufacturing Company, East Pittsburgh, Pa., a corporation of Pennsylvania Application March 25, 1938, Serial No. 198,080

8 Claims. (Cl. 171—252)

The present invention relates to bearings for dynamoelectric machines and, more specifically, it relates to improved means for cooling the bearings of such machines, especially those of large size or of relatively high speed.

A large amount of heat is generated in the bearings of dynamoelectric machines which are of large size or which operate at high speeds, and it is desirable, and in many cases necessary, to provide some means for cooling the bearings to assist in dissipating this heat. This has been done by circulating oil or water around or through the bearing, but this method of cooling requires an external circulating system, including pumps and coolers, and, therefore, adds materially to the complication and expense of the installation.

The object of the present invention is to provide a simple and inexpensive means for cooling the bearings of dynamoelectric machines.

A more specific object is to provide a means for using a part of the ventilating air or other gaseous cooling medium of such machines to cool the bearings.

These objects are attained by providing cooling or heat exchange means surrounding the bearing, through which the ventilating air or other gas may be circulated, together with means for diverting a portion of the air from a high pressure part of the machine into such cooling means. It will be obvious that this basic idea can be embodied in various forms and may be adapted for use in many different types of dynamoelectric machines.

The invention will be more fully understood from the following detailed description taken in connection with the accompanying drawings, in which.

Figure 1:
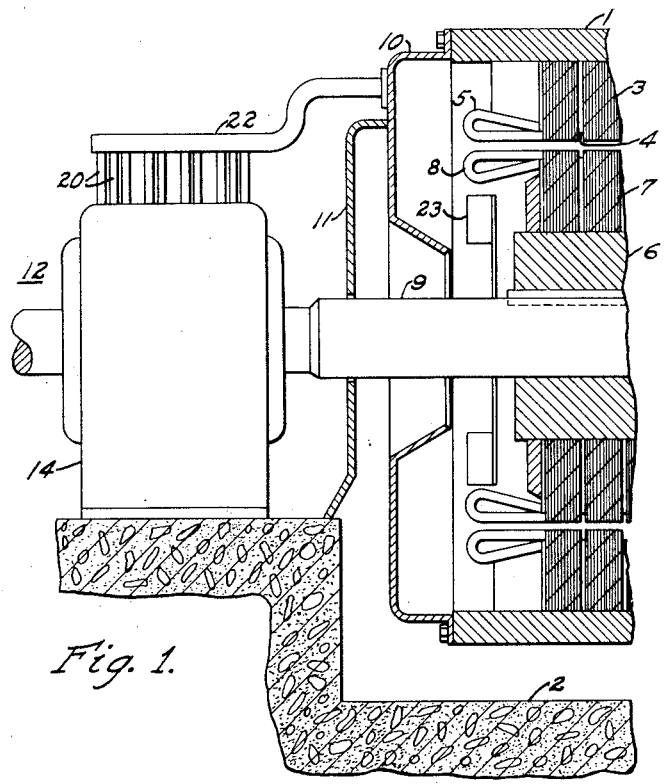
Figure 1 is a fragmentary side view, partly in section, of a large dynamoelectric machine.
Figure 2:
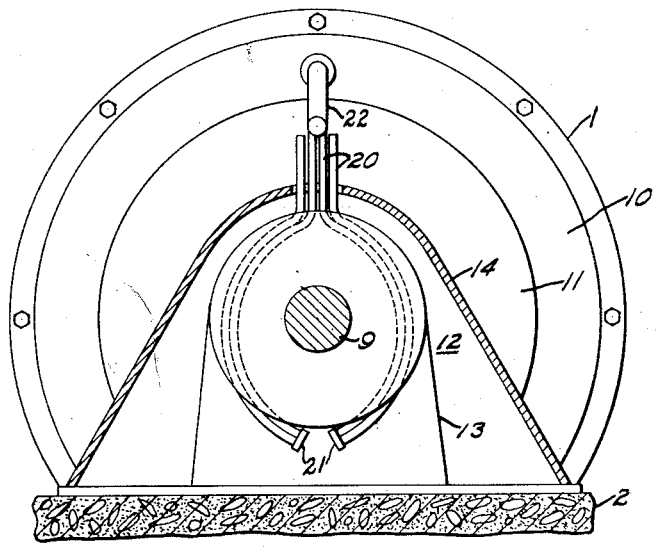
Fig. 2 is an end view of the machine of Fig. 1.

The machine shown in Fig. 1 consists of an outer frame or housing 1 which is supported on a base or foundation 2. The housing supports a laminated stator core 3 which is provided with radial air ducts 4, and has suitable windings 5 placed in slots therein. The rotor 6 has a laminated core 7 carrying windings 8, and is keyed or otherwise secured to a shaft 9. An end bell 10 is bolted to the end of the housing 1 and an outer end bell 11 is secured to the end bell 10. The shaft 9 rotates in a bearing 12 which rests on supports 13 on the base 2 outside of the end bell. A similar bearing of identical construction is, of course, provided at the opposite end of the machine. A bearing housing or cap 14 is placed over the bearing to protect it.

Figure 3:
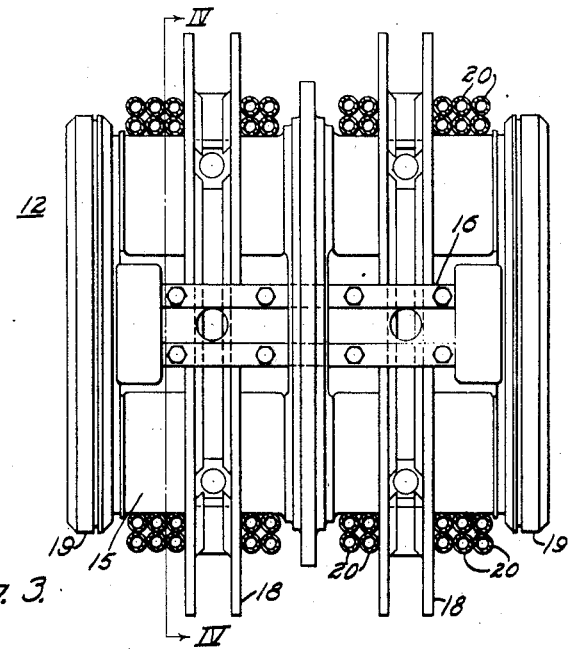
Fig. 3 is a plan view of a bearing.
Figure 4:
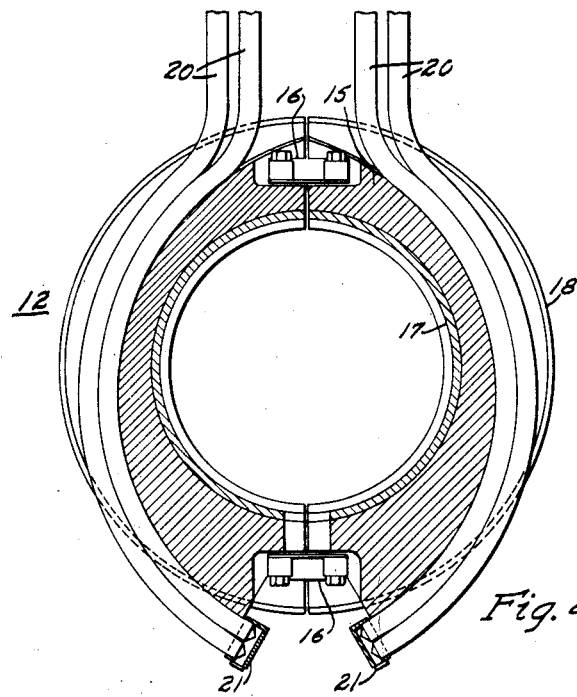
Fig. 4 is a sectional view approximately on the line IV—IV of Fig. 3.

The construction of the bearing is shown more in detail in Figs. 3 and 4. While any suitable type of bearing may be used, a shoe-type bearing has been shown in the drawings, comprising bearing shoe members 15, which are secured together on opposite sides of the shaft by clamping members 16, and are provided with suitable bearing surfaces 17 in contact with the shaft. The bearing shoes 15 have flanges 18 and end flanges 19 which provide supporting surfaces on which the bearing rests on the members 13.

For the purpose of cooling the bearing, there is provided a plurality of tubes 20, preferably of copper and these are soldered, welded or otherwise secured to the bearing shoes. As shown in Fig. 4, these tubes are arranged in pairs and are bent to conform to the shape of the bearing. The inner and outer tubes of each pair are soldered or brazed together, and a cap 21 is provided at their lower ends and secured to them with an airtight joint. Any suitable number of pairs of tubes may be provided between the flanges 18 and 19, as shown in Fig. 3, and the adjacent pairs of tubes are soldered or otherwise secured together. The inner tubes of each pair are connected at their upper ends to a tube or conduit 22, which is closed at one end and connected at the other end to the end bell 10 so that air can flow from the interior of the end bell through the conduit and the tubes.

A fan 23 is mounted on the shaft 9 and this fan draws air in through the end bell 10, and circulates it over the windings and through the rotor and stator cores of the machine, after which it is discharged in any desired or usual manner. The conduit 22 is connected to the end bell at its upper portion where the pressure of the air drawn in by the fan is considerably higher than atmospheric pressure. A portion of this air, therefore, flows through the conduit 22 and through the inner tubes 20, which are in immediate contact with the bearing, and is then directed by the cap members 21 into the outer tubes through which it flows and is discharged into the surrounding air. It will be seen that this arrangement provides very effective cooling for the bearing, since the cool air which has been drawn into the end bell 10 passes through the tubes 20 in direct contact with the bearing and, therefore, removes the heat generated therein very efficiently. Any desired number of tubes may be provided in order to obtain the necessary cooling effect.

This arrangement can be readily adapted for use in a totally enclosed machine without substantial change. If air is used as the cooling medium in such a machine, the arrangement described above can be used without change. If the machine is hydrogen cooled, it would, of course, be undesirable for the tubes to discharge into the air, and in this case discharge conduits are provided for the outer tubes to connect them with the end bell of the machine at a point where the internal pressure is lower than at the point where the conduit 22 is connected so that there will be a continuous flow of hydrogen through the tubes.

Figure 5:
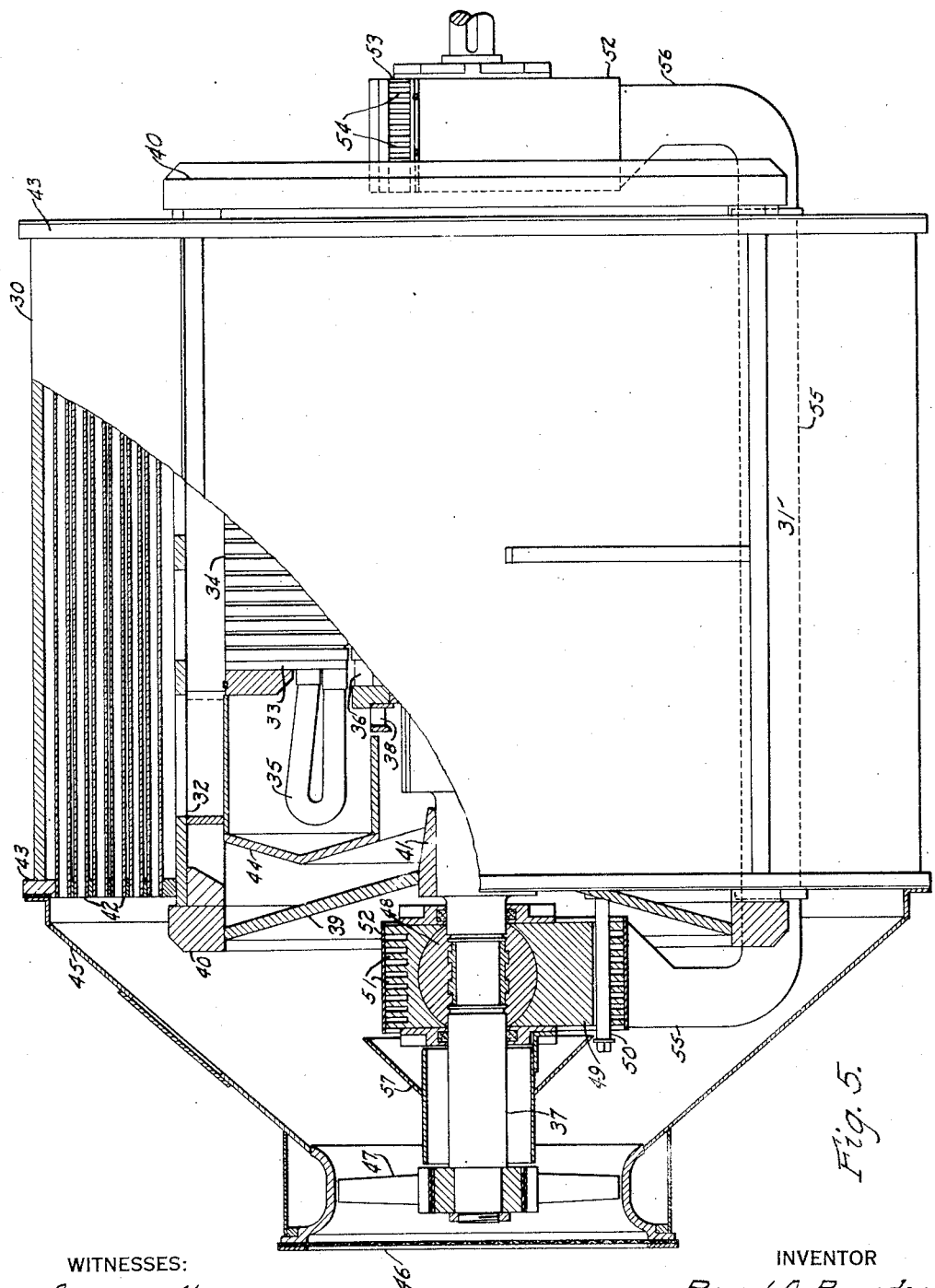
Fig. 5 is a side view, partly in section, of an electric motor showing another embodiment of the invention.
Figure 6:
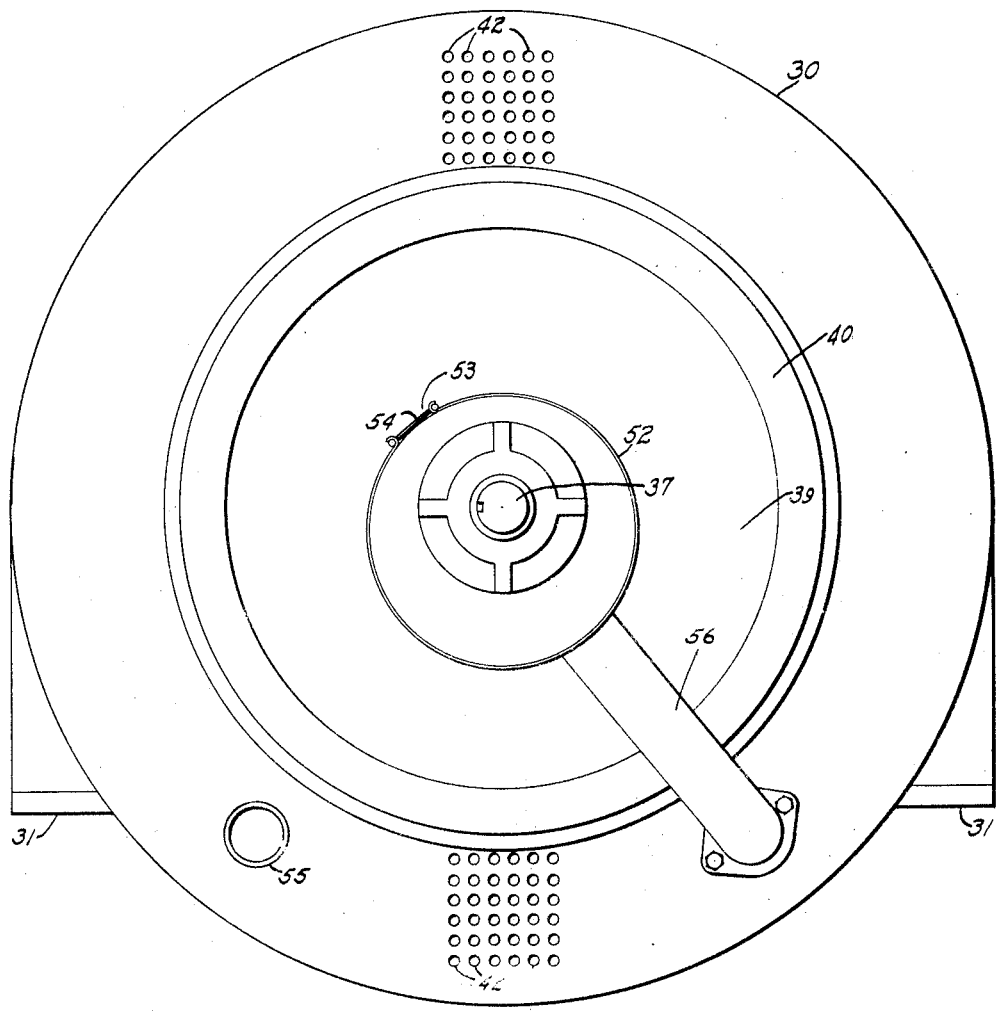
Fig. 6 is an end view of the machine of Fig. 5 as seen from the right of that figure.

Figs. 5 and 6 show another embodiment of the present invention in which it is applied to cooling the bearings of a totally enclosed, explosion-proof motor. This motor has an outer frame or housing member 30 provided with feet or supports 31 and an inner frame structure 32. A laminated stator core 33 having radial air ducts 34 is supported on the frame structure 32 and stator windings 35 of any desired type are arranged in slots in the core. The machine also has a rotor member 36, of any suitable construction, which is mounted on a shaft 37 and has fan blades 38 on its ends. The machine is closed at the ends by concave end bells 39 and end rings 40 and the shaft 37 passes through a gland 41 in the end bell in order to provide an air-tight seal.

For the purpose of cooling the machine, a plurality of coolers or heat exchangers 42 is provided, located between the inner frame structure 32 and the outer housing 30. These heat exchangers consist of a plurality of tubes extending longitudinally from one end of the machine to the other and supported in the end plates 43, to which they are secured with air-tight joints. Only two of these coolers have been shown, but it will be understood that a greater number may be used, if necessary, spaced around the periphery of the machine. The air within the housing is circulated by the fan blades 38 around the stator windings and through the ducts 34 in the stator core from which it flows through the coolers 42. The air passes longitudinally over the tubes of the coolers and escapes at the ends into the end portions of the machine inside the end bells 39 where it is again circulated by the fan blades. Inner end bells 44 may be provided to prevent heated air from recirculating without passing through the cooler.

In order to cool the air circulating within the machine, provision is made for directing a flow of cool air through the tubes of the coolers 42. This is done by providing an air housing 45 at one end of the machine which is secured to the frame 30. This housing has a large opening 46 at its outer end, which may be covered by a screen and a fan 47 is located in this opening and mounted on the end of the shaft 37. This fan draws air into the housing 45 and maintains the pressure therein somewhat above atmospheric, so that a continuous stream of cool air flows through the tubes of the coolers 42.

The bearings for the shaft 37 are located at each end of the machine outside the end bells 39, and the bearing at the left-hand end, as seen in the drawings, is located within the air housing 45. The bearings are identical at both ends of the machine and only one will be described in detail. This bearing has been shown as of the self-aligning type, although it will be understood that any suitable type may be used. As shown, the bearing consists of a bearing member 48, which is supported in a spherical seat in a housing 49. Suitable means for lubricating the bearing will be provided, of course, but have not been shown in order to avoid unnecessary complication of the drawings. The bearing is supported by a bracket member 50 which is secured to the end bell 39. In order to facilitate the dissipation of heat from the bearing, the bearing housing 49 is provided with a plurality of fins 51 which extend circumferentially entirely around it.

Identical circular covers 52 of sheet metal encircle both bearings and fit closely over the outer periphery of the fins. The cover is more clearly shown in Fig. 6, and is split at one side to provide a large opening 53 which has flanged edges and a clamping bolt 54, by means of which the cover can be tightened on the bearing. Another opening is formed diametrically opposite to the opening 53, and a sheet metal tube or conduit is secured in the latter opening. The tube 55 connected to the cover of the left-hand bearing is formed with a right angle bend and extends longitudinally throughout the length of the machine between the inner and outer frames to the opposite end where it opens into the air.

The bearing at the right-hand end of the machine is of similar construction and a tube 56 is connected to the lower opening of its cover. This tube is similar in all respects to the tube 55, and extends longitudinally of the machine to the opposite end where it opens into the air housing 45. As shown in Fig. 6, the two tubes 55 and 56 are positioned on opposite sides of the machine, and the covers 52 are angularly arranged to permit this disposition.

A baffle member 57 of sheet metal is provided within the air housing to prevent the air from the fan blowing directly onto the bearing and to direct it outwards towards the coolers 42. The action of the fan 47 keeps the air in the housing 45 at a pressure considerably above atmospheric, and it will be obvious, therefore, that a portion of this air will flow into the opening 53 in the cover 52 and will flow over the fins 51 on the bearing and through the tube 55 to the opposite end of the machine where it will be discharged into the air. Similarly, a portion of the air will flow through the tube 56 to the opposite end of the machine and through the cover 52 of the bearing at that end, passing over the fins and being discharged through the opening 53. Thus a steady stream of cool air will flow continuously over both bearings and materially improve the dissipation of heat from them.

It will be apparent, therefore, that a very effective means has been provided for cooling the bearings of dynamoelectric machines of relatively large size or of high speed, and that the basic idea underlying the invention is of broad scope and is capable of many applications in various embodiments to adapt it for use under different conditions and with different types of machines. It is to be understood, therefore, that, although two specific embodiments of the invention have been illustrated and described, it is not limited to these particular constructions, but that the basic idea may be applied in other forms and in various modifications and arrangements without departing from the spirit of the invention. The invention is therefore not limited to any particular embodiment, but in its broadest aspects it includes all equivalent forms and modifications which come within the scope of the appended claims.

I claim as my invention:

1. A dynamoelectric machine comprising a stator member and a rotor member having a shaft, an end bell at one end of the stator member, a bearing for the shaft outside the end bell, means within the end bell for circulating a ventilating gas through the machine, a plurality of tubes on the exterior of the bearing extending at least part way around it, and a conduit connecting one end of each of said tubes to the end bell at a point where the pressure of the gas is greater than atmospheric.

2. A dynamoelectric machine comprising a stator member including a frame, a rotor member having a shaft, an end bell at each end of the frame, bearings for the shaft at each end of the machine outside the end bells, heat-dissipating fins on the bearings, a housing member secured to the frame at one end thereof and forming an enclosure extending beyond the bearing at that end, a fan in the enclosure to maintain an air pressure greater than atmospheric therein whereby air is caused to flow over the frame, a member encircling the bearing within the enclosure and fitting closely over the fins, said member having an opening for the entrance of air and an opening for the discharge of air, and means connected to the last-mentioned opening to discharge the air outside of the enclosure, a similar member encircling the bearing at the opposite end of the machine and fitting closely over the fins thereon, said member having an opening for the discharge of air and an opening for the entrance of air, and a conduit extending from said enclosure to the last-mentioned opening.

3. A dynamoelectric machine having a stator member and a rotor member, enclosing means at the end of the stator member, means for cooling the machine by directing a stream of ventilating gas from outside the machine in a path which causes it to flow in heat-exchange relation to the machine, a bearing for the rotor member outside of said enclosing means, heat exchange means on the bearing, and means for withdrawing a portion of said gas from said path and diverting it into a different path, said last mentioned path including conduit means which directs the gas over said heat exchange means to cool the bearing.

4. A dynamoelectric machine having a stator member and a rotor member, enclosing means at the end of the stator member, means for cooling the machine by directing a stream of ventilating gas from outside the machine in a path which causes it to flow in heat-exchange relation to the machine, a bearing for the rotor member outside of said enclosing means, heat exchange means on the bearing, and a conduit arranged to withdraw a portion of said ventilating gas from said path and to cause it to flow in a different path, said conduit directing the gas through said heat exchange means.

5. A dynamoelectric machine comprising a stator member and a rotor member, means for cooling the machine by directing a stream of ventilating gas from outside the machine in a path which causes it to flow in heat-exchange relation to the machine, said gas being maintained at a pressure higher than atmospheric in certain parts of the machine, a bearing for the rotor member, said bearing being external to the machine, heat exchange means on the bearing, and means for withdrawing a portion of said ventilating gas from the high pressure parts of the machine and diverting it into a path different from said first mentioned path, said last mentioned path including said heat exchange means, whereby the bearing is cooled by the diverted portion of the ventilating gas.

6. A dynamoelectric machine comprising a stator member and a rotor member, means for cooling the machine by directing a stream of ventilating gas from outside the machine in a path which causes it to flow in heat-exchange relation to the machine, said gas being maintained at a pressure higher than atmospheric in certain parts of the machine, a bearing for the rotor member, said bearing being external to the machine, heat exchange means on the bearing, and means for withdrawing a portion of said ventilating gas from the high pressure parts of the machine and diverting it into a path different from said first mentioned path, said means comprising a conduit which connects said high pressure parts of the machine to said heat exchange means.

7. A dynamoelectric machine comprising a stator member including a frame and a rotor member having a shaft, an end bell secured to the frame, a bearing for the shaft outside the end bell, a plurality of heat-dissipating fins on the bearing, a cover enclosing the bearing and fitting closely over the fins, means for blowing a stream of air over the frame, and means for withdrawing a part of said air from the main stream and causing it to flow in a different path, said path including said bearing enclosing cover.

8. A dynamoelectric machine comprising a stator member including a frame, a rotor member having a shaft, a housing member secured to one end of the frame and forming an enclosure external thereto, a bearing for the shaft within the enclosure, a plurality of heat-dissipating fins on the bearing, a fan in the enclosure to maintain an air pressure greater than atmospheric therein whereby air is caused to flow over the frame, and conduit means for withdrawing a part of said air from the main stream of air and causing it to flow in a different path, said means including a member enclosing the bearing and fitting closely over the fins, said member having an opening through which the air enters and another opening through which it discharges at atmospheric pressure.

RENÉ A. BAUDRY.